(12) United States Patent
Levy et al.

(10) Patent No.: US 9,125,379 B1
(45) Date of Patent: Sep. 8, 2015

(54) PORTABLE BRANDING IRON

(71) Applicants: Jerone Levy, Bessemer, AL (US); Javonne L. Levy, Bessemer, AL (US)

(72) Inventors: Jerone Levy, Bessemer, AL (US); Javonne L. Levy, Bessemer, AL (US)

(*) Notice: Subject to any disclaimer, the term of this patent is extended or adjusted under 35 U.S.C. 154(b) by 307 days.

(21) Appl. No.: 13/874,783

(22) Filed: May 1, 2013

(51) Int. Cl.
*A01K 11/00* (2006.01)
*B44B 7/02* (2006.01)

(52) U.S. Cl.
CPC ............ *A01K 11/005* (2013.01); *B44B 7/02* (2013.01)

(58) Field of Classification Search
None
See application file for complete search history.

(56) References Cited

U.S. PATENT DOCUMENTS

| | | | |
|---|---|---|---|
| 2,246,719 A | 6/1941 | Burnham | |
| 2,514,618 A | 7/1950 | Ancell | |
| 3,067,314 A | 12/1962 | Helbling | |
| D195,929 S | 8/1963 | Lyman | |
| 3,408,478 A * | 10/1968 | Penn | 219/229 |
| D268,536 S | 4/1983 | Davis | |
| 4,906,815 A | 3/1990 | Yarrington | |
| 5,374,806 A * | 12/1994 | Chou | 219/229 |
| 5,641,418 A * | 6/1997 | Chou | 219/229 |
| 6,416,320 B1 * | 7/2002 | Roffe et al. | 433/32 |
| 7,199,333 B2 | 4/2007 | Alphandary | |
| 2005/0015080 A1 * | 1/2005 | Ciccone et al. | 606/30 |

* cited by examiner

*Primary Examiner* — Joseph M Pelham

(57) ABSTRACT

The present invention features a portable branding iron system. The system includes a handle with a handle connector, a built-in rechargeable battery, a heating coil, and a controller. A backing plate is removably connected to the handle via a threaded rod. A patterned metal, such as raised letters or logo, and an optional rotatory numbers are removably disposed on the backing plate. A power switch is disposed on the handle to turn ON or OFF the branding iron. A heat sensor is disposed on the handle connector and sends the temperature signal to the controller to power on one of a plurality of a temperature indicator LEDs.

8 Claims, 7 Drawing Sheets

PORTABLE BRANDING IRON

FIELD OF THE INVENTION

The present invention relates to a branding iron, and more particularly to a portable marker iron for livestock or woodcrafts.

BACKGROUND OF THE INVENTION

Branding or marking of livestock is a common practice to indicate ownership for ranchers. It entailed burning a mark on livestock using a hot iron. Most branding irons are fire or gas heated, and thus inconvenient for the ranchers to portably carry on. Moreover, most branding irons have fixed heating metal and the ranchers would have to carry on multiple irons if different marks are needed. Therefore, there is a need for a portable branding iron with the capacity for a variable marks.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a portable branding iron system. The system includes a handle with a handle connector, a built-in rechargeable battery, a heating coil, and a controller. A backing plate is removeably connected to the handle via a threaded rod. A patterned metal, such as raised letters or logo, and an optional rotatory numbers are removably disposed on the backing plate. A power switch is disposed on the handle to turn ON or OFF the branding iron. A heat sensor is disposed on the handle connector and sends the temperature signal to the controller to power on one of a plurality of a temperature indicator LEDs.

DESCRIPTION OF PREFERRED EMBODIMENTS

Figure 1:
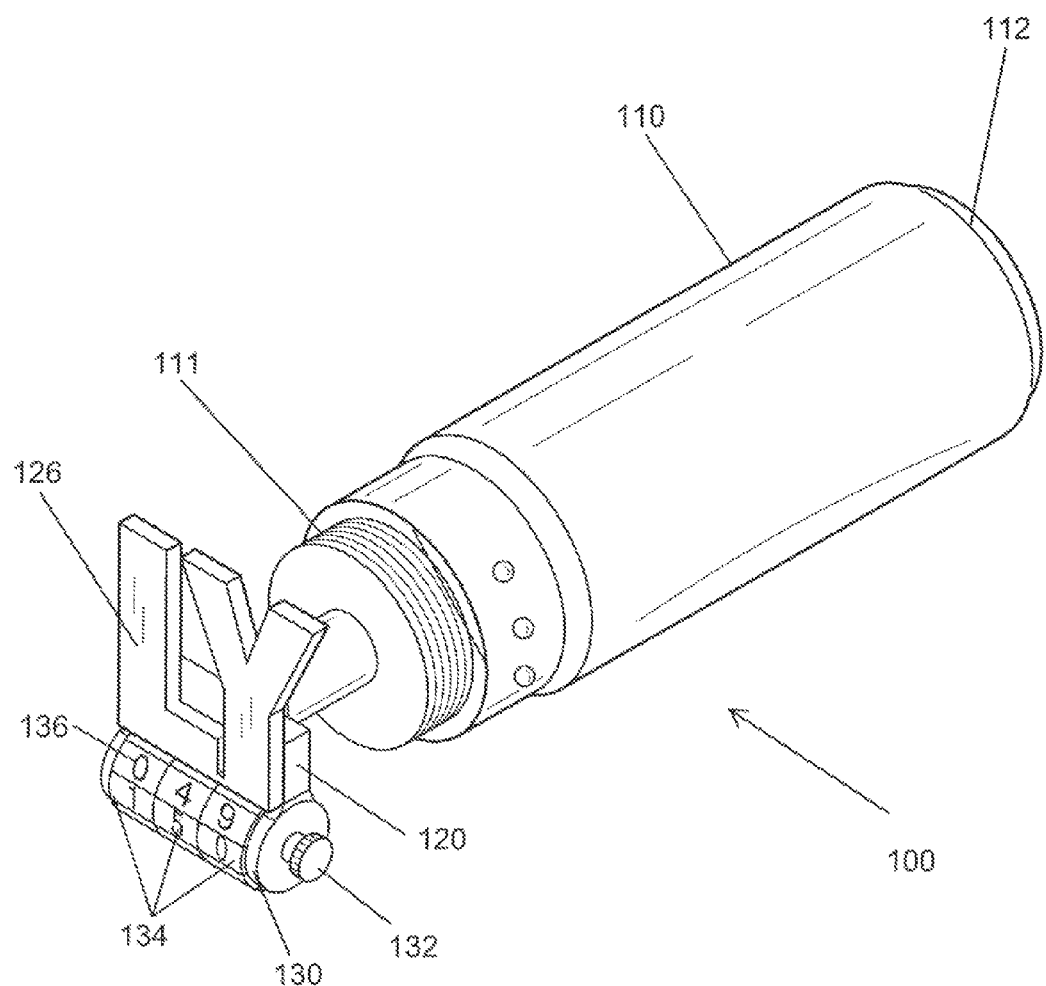
FIG. 1 shows an isometric view of the portable branding iron system.
Figure 2:
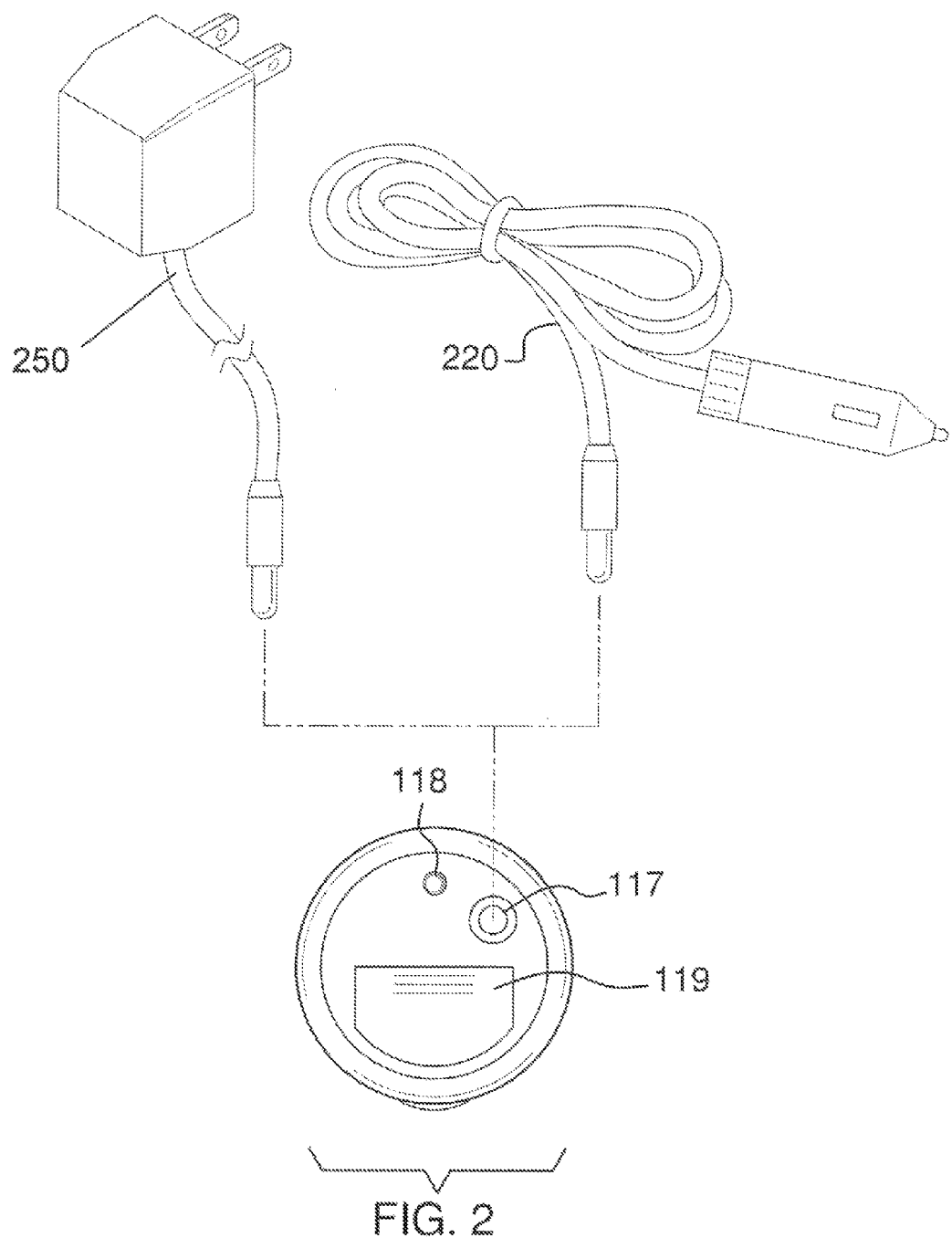
FIG. 2 shows a back view of the portable branding iron system. In some embodiments, a wall adaptor charger may be used in accordance with the present invention.
Figure 3:
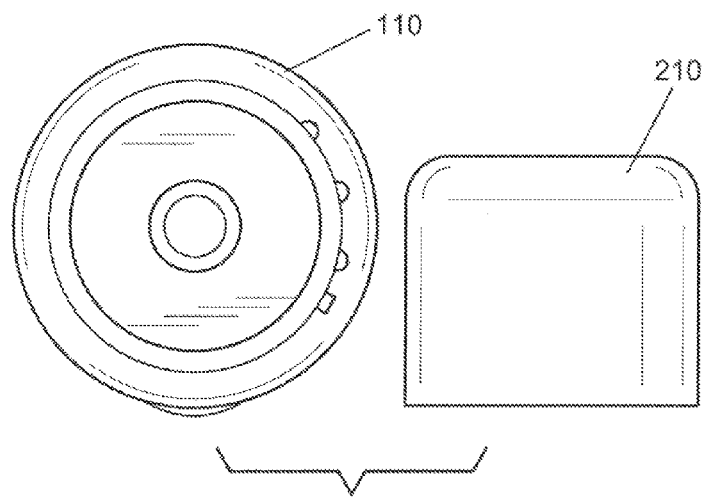
FIG. 3 shows a front view of the portable branding iron system.
Figure 4:
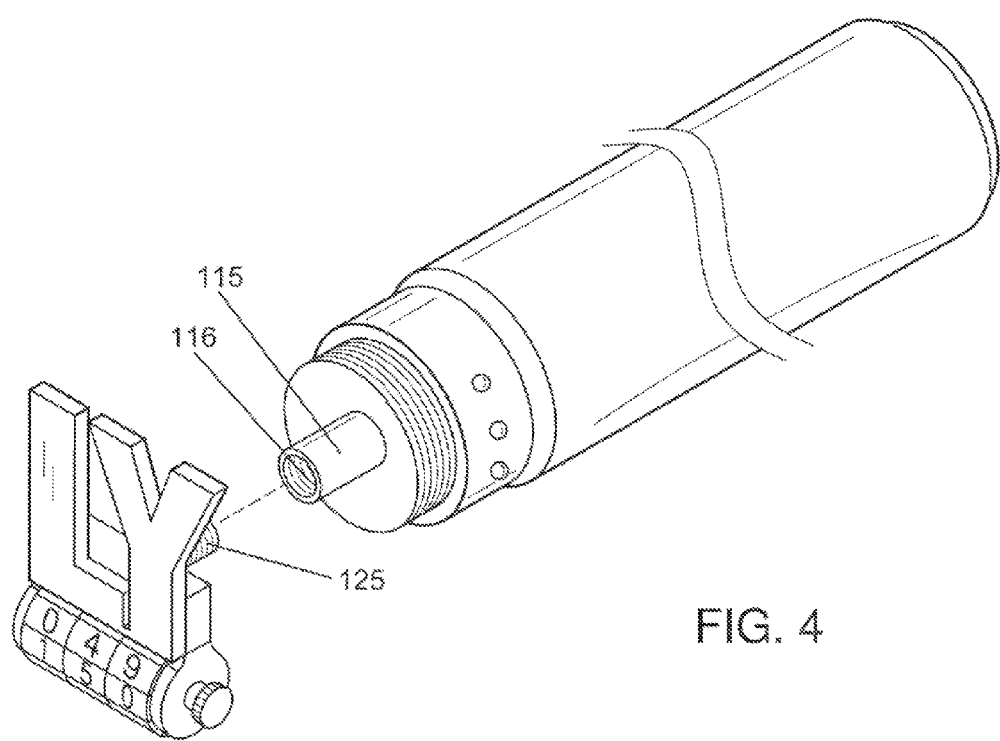
FIG. 4 shows an exploded view of the portable branding iron system.
Figure 5:
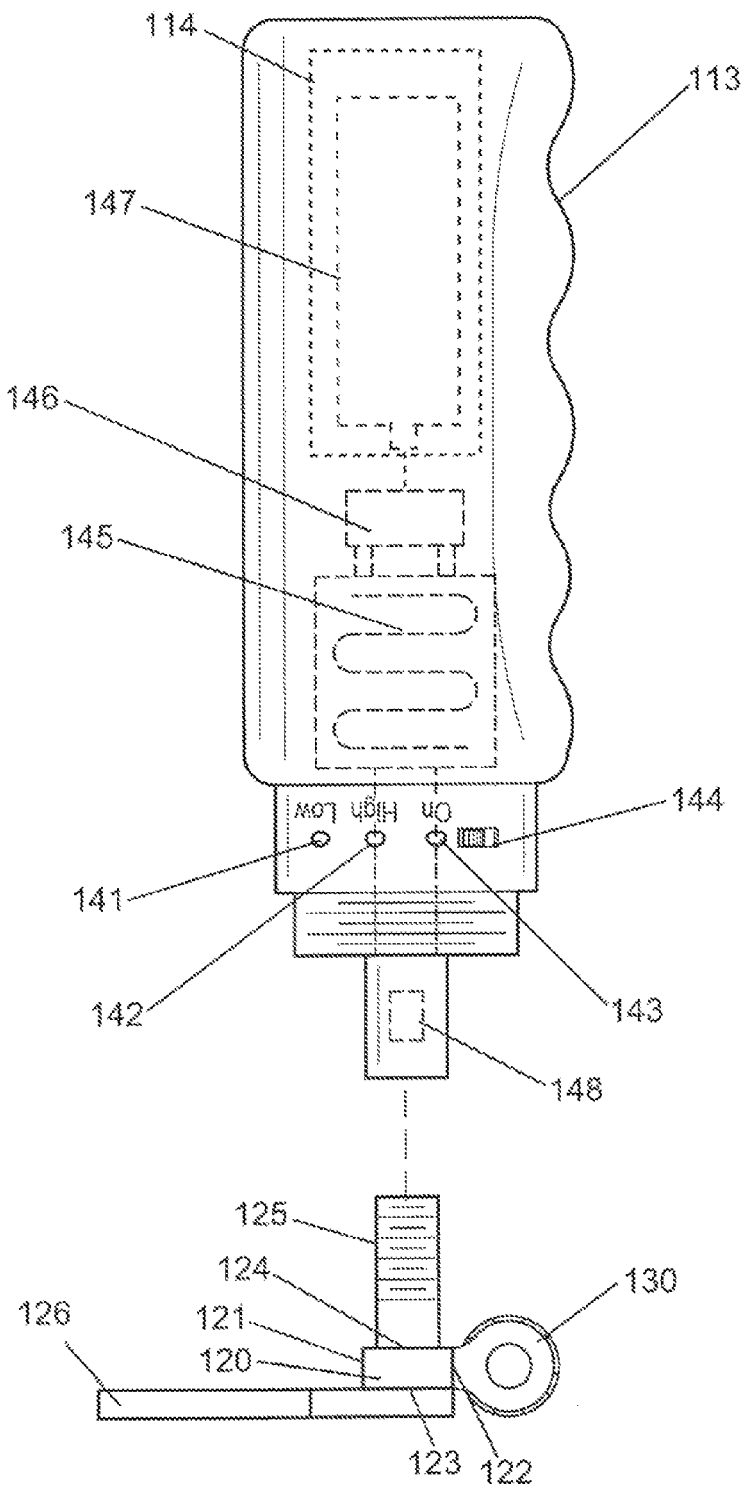
FIG. 5 shows a side view of the portable branding iron system.
Figure 6:
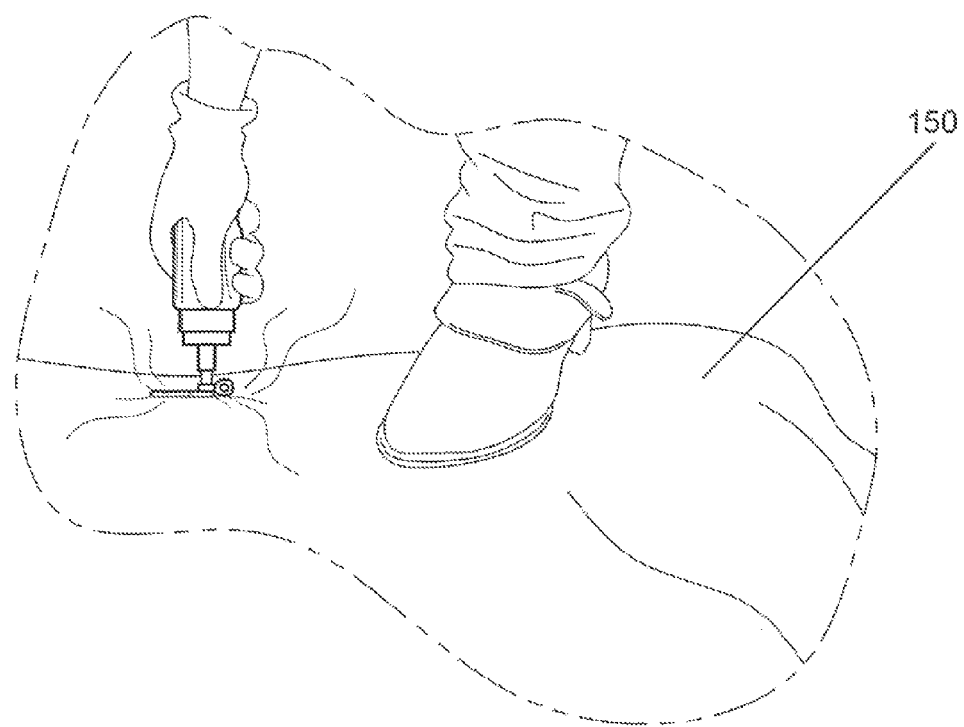
FIG. 6 shows an in-use view of the portable branding iron system.

Following is a list of elements corresponding to a particular element referred to herein:

100 portable branding iron system
110 handle
112 first end of the handle
114 second end of the handle
113 handle grip
115 handle connector
116 inner thread of the handle connector
117 charging port
118 charging indicator LED
119 battery compartment cover
120 backing plate
121 upper side of the backing plate
122 lower side of the backing plate
123 front side of the backing plate
124 back side of the backing plate
125 threaded back rod
126 patterned metal
130 rotatable iron
132 rotary knob
134 rotary columns
136 iron character
141 Low temperature indicator
142 High temperature indicator
143 power ON indicator
144 ON/OFF switch
145 heating coil
146 controller
147 rechargeable battery
148 heat sensor
150 livestock
210 threaded cap
212 cap thread
214 cap battery
216 cap switch
218 cap power indictor
219 cap heating coil
220 battery charging cable
250 wall adaptor charger Referring now to FIGS. 1-8, the present invention features a portable branding iron system (100). The system comprises a handle (110), a backing plate (120), an optional rotary iron (130) and a cap (120).

The handle (110) has a threaded first end (111), a second end (112), and a handle connector (115) disposed on the first end, wherein the handle connector has a hole with an inner thread (116); wherein a rechargeable battery (147) resides within a battery compartment (114) disposed within the handle (110), a controller (146) and a heating coil (145) are disposed within the handle (110), wherein a battery compartment cover (119) is disposed on the second end (112) to access the battery; wherein an ON/OFF switch (144) and a power ON indicator (143) are disposed on the handle adjacent to the first end (112), wherein the controller (146) is operatively connected to (i) the battery (147), (ii) the ON/OFF switch (144), (iii) the heating coil (145) and (iv) the power ON indicator (143); wherein the handle connector (115) contacts the heating coil (145) such that the heat from heating coil (145) is transferred to the handle connector directly.

After the ON/OFF switch is turned on, the controller (146) is configured to turn on the power ON indicator (143) and close the electrical connection between the battery (147) and the heating coil (145) such that the heating coil is heated with battery power. In some embodiments, the power ON indicator (143) is a green LED (light emitting diode).

The metal backing plate (120) has a front side (123), a back side (124), an upper side (121) and a lower side (122), wherein a threaded connection rod (125) is disposed on the back side (124) to connect to the handle connector (115); wherein a patterned metal (126) is removably disposed on the front side; wherein the patterned metal (126) is heated by the battery power via the handle connector (115) and metal backing plate (120), wherein a patterned metal (126) is used to leave a mark on a livestock (150) after heated.

The threaded cap (210) has a cap thread (212) configured to removably engage the threaded first end (111) of the handle to enclose the metal backing plate (120) and the patterned metal (126) within the cap.

In some embodiments, the patterned metal (126) is a standing letter, a standing letter combination, a standing number, a standing logo, or a combination herein. The letter combination can be the initial of the rancher, livestock owner.

In some embodiments, a rotatable iron (130) is removably disposed on the lower side (122) of the backing plate (120), wherein the rotatable iron (130) comprises multiple rotary columns (134) and a rotary control knob (132), wherein the rotary columns are rotatable independently and lockable via the rotary control knob (146), wherein each rotary column (134) comprises multiple iron characters (136), wherein when the iron characters (136) are aligned with the patterned metal (126) when the iron characters are in the front-most position for branding on the livestock together with the patterned metal (126). The rotatable iron (130) resides within the cap together with the patterned metal (126) when the cap (210) engages the first end (111) of the handle (110). In some embodiments, the iron characters are numbers, letters, or a combination herein, and have a size of 1 inch by 1 inch.

Figure 8:
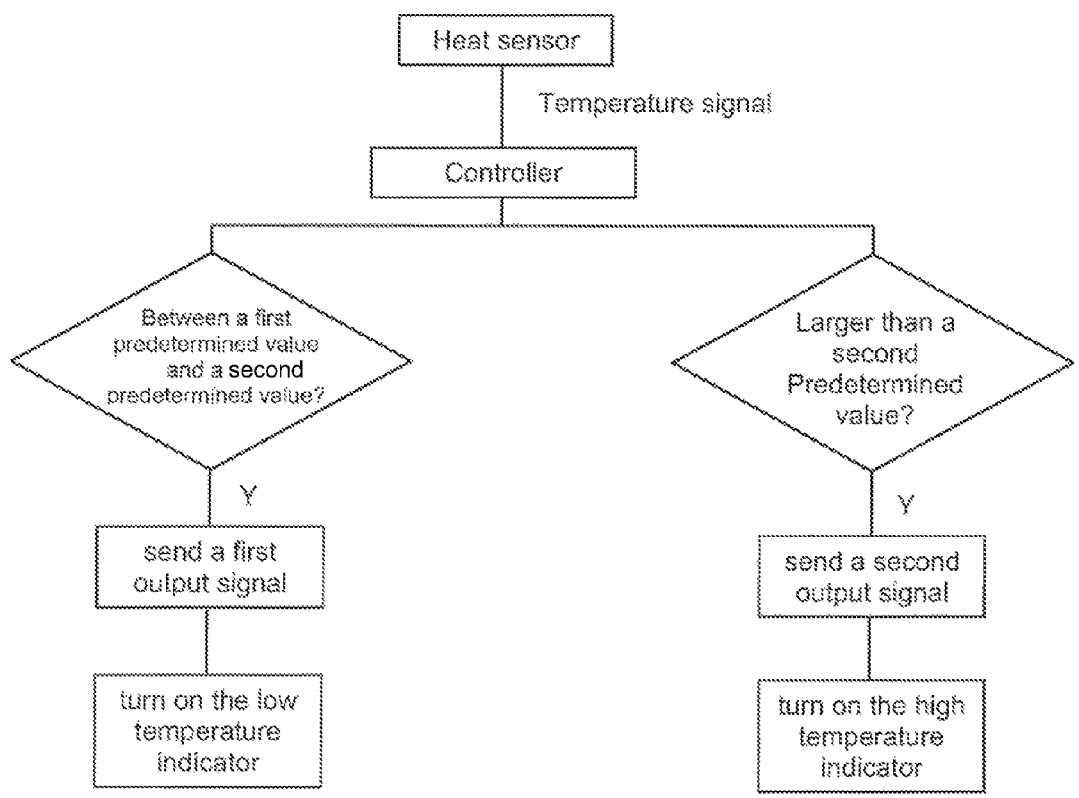
FIG. 8 shows a block diagram of the controlling of the temperature indicators according to the handle connector temperature value.

In some embodiments, a heat sensor (148) is disposed within the handle connector (115), wherein a low temperature indicator (141) and a high temperature indicator (142) are disposed on the handle (110) adjacent to the first end (111), wherein the heat sensor, low temperature indicator and high temperature indicator are operatively connected to the controller wherein the heat sensor (148) is configured to sense a temperature of the handle connector (115) and send a temperature signal of the temperature of the handle connector (115) to the controller, wherein the controller compares the temperature signal to a first pre-determined temperature value and a second pre-determined value; wherein when the temperature signal is between the first pre-determined temperature value and the second pre-determined value, the controller (115) send a first output signal to the low temperature indicator (141) to turn on the low temperature indicator (141); wherein when the temperature signal is above the second pre-determined value, the controller (115) send a second output signal to the high temperature indicator (142) to turn on the high temperature indicator (142). The block diagram of the controlling of the temperature indicators according to the handle connector temperature value is shown in FIG. 8. In some embodiments, the controller (115) is a microprocessor module with built-in memory for storing the pre-determined temperature values and control logic codes. In some embodiments, the heat sensor (148) is a thermal-couple.

In some embodiments, the second pre-determined value is a temperature suitable for branding on a livestock, such as around 500 Fahrenheit degree. In some embodiments, the first pre-determined value is a value which ordinary people will too hot for skin touch, such as above 125 Fahrenheit degree.

In some embodiments, the low temperature indicator (141) is an orange color LED (light emitting diode). In some embodiments, the high temperature indicator (142) is a red color LED (light emitting diode). When a user sees the red color, he/she knows that the iron is ready for ironing.

In some embodiments, a charging port (117) and a charging indicator (118) are disposed on the second end (112) of the handle (110), wherein the charging indicator (118) and a charging port (117) are operatively connected to the rechargeable battery (147), wherein the charging port (117) is configured to receive an battery charging cable (220) to re-charge the battery via external power source, wherein the charging indicator (118) is configured to turn on when the rechargeable battery (147) is recharging. In some embodiments, a wall adaptor charger (250) may be used in accordance with the present invention.

Figure 7:
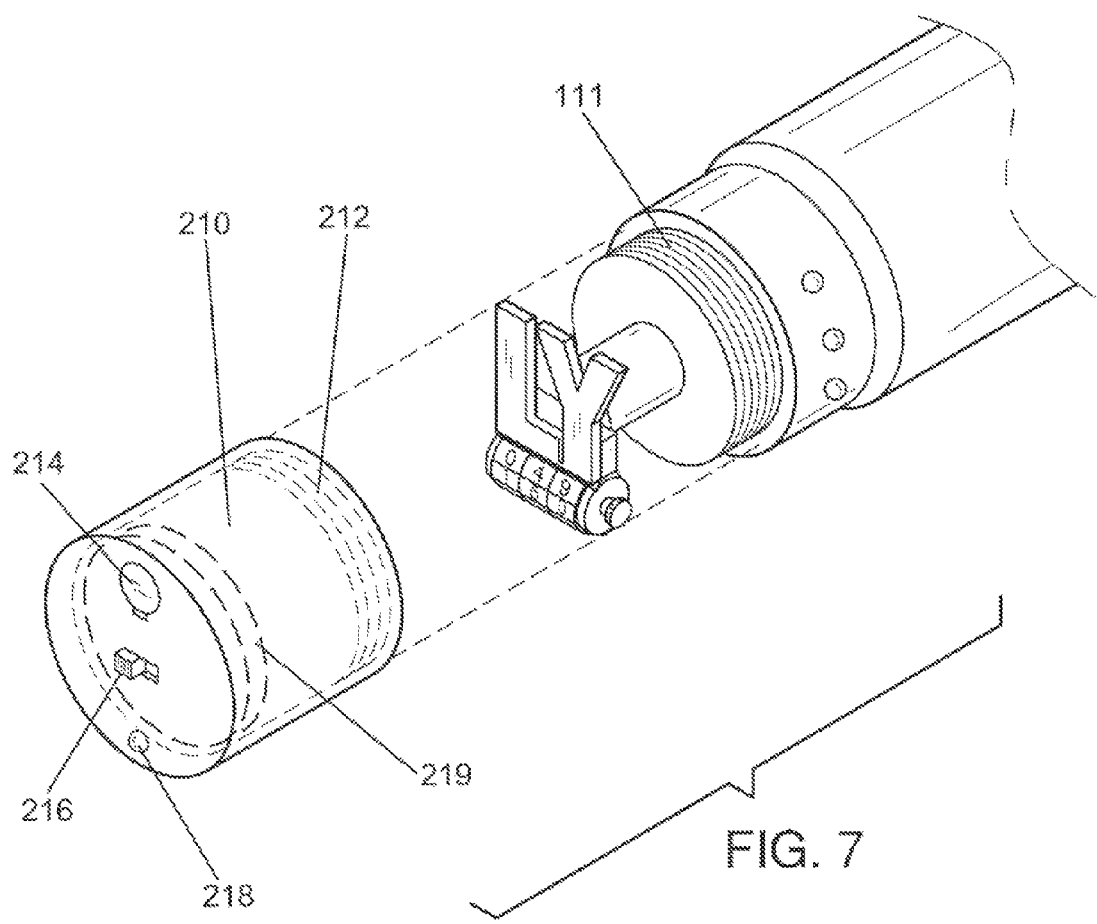
FIG. 7 shows an alternative embodiment of the portable branding iron system.

In some embodiments, the cap (210) further comprises a cap battery (214), a cap heating coil (219), a cap switch (216), and a cap power indicator (218), as shown in FIG. 7. When the cap switch (216) is turned on, the cap heating coil (219) is heated by the cap battery (214) to expedite the heating process for the patterned metal (126) and a cap power indicator (218) is turned on.

In some embodiments, the handle further comprises a hand grip (113), wherein the grip (113) is made of heat resistant silicon rubber. In some embodiments, the grip is wave-shaped.

As used herein, the term "about" refers to plus or minus 10% of the referenced number. For example, a 1 inch in height refereed to a height between 0.9 inch and 1.1 inch.

The disclosures of the following U.S. Patents are incorporated in their entirety by reference herein: (1) U.S. Pat. No. 2,246,719, (2) U.S. Pat. No. 2,514,618, (3) U.S. Pat. No. 3,067,314, (4) U.S. Pat. No. 4,906,815, (5) U.S. Pat. No. 7,199,333, (6) U.S. D195929 and (7) U.S. D268536.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A portable branding iron system (100) for branding on livestock, wherein the system comprising:
   (a) a handle (110) with a threaded first end (111), a second end (112), and a handle connector (115) disposed on the first end, wherein the handle connector has a hole with an inner thread (116); wherein a rechargeable battery (147) resides within a battery compartment (114) disposed within the handle (110), a controller (146) and a heating coil (145) are disposed within the handle (110), wherein a battery compartment cover (119) is disposed on the second end (112) to access the battery; wherein an ON/OFF switch (144) and a power ON indicator (143) are disposed on the handle adjacent to the first end (112), wherein the controller (146) is operatively connected to (i) the battery (147), (ii) the ON/OFF switch (144), (iii) the heating coil (145) and (iv) the power ON indicator (143); wherein the handle connector (115) contacts the heating coil (145) such that the heat from heating coil (145) is transferred to the handle connector directly;
   wherein after the ON/OFF switch is turned on, the controller (146) is configured to turn on the power ON indicator (143) and close the electrical connection between the battery (147) and the heating coil (145) such that the heating coil is heated with battery power;

(b) a metal backing plate (120) with a front side (123), a back side (124), an upper side (121) and a lower side (122), wherein a threaded connection rod (125) is disposed on the back side (124) to connect to the handle connector (115); wherein a patterned metal (126) is removably disposed on the front side; wherein the patterned metal (126) is heated by the battery power via the handle connector (115) and metal backing plate (120), wherein a patterned metal (126) is used to leave a mark on a livestock (150) after heated; and (c) a threaded cap (210) with a cap thread (212), wherein the cap thread (212) is configured to removably engage the threaded first end (111) of the handle to enclose the metal backing plate (120) and the patterned metal (126) within the cap.

2. The portable branding iron system (100) of claim 1, wherein the patterned metal (126) is a standing letter, a standing letter combination, a standing number, a standing logo, or a combination herein.

3. The portable branding iron system (100) of claim 1, wherein a rotatable iron (130) is removably disposed on the lower side (122) of the backing plate (120), wherein the rotatable iron (130) comprises multiple rotary columns (134) and a rotary control knob (132), wherein the rotary columns are rotatable independently and lockable via the rotary control knob (146), wherein each rotary column (134) comprises multiple iron characters (136), wherein when the iron characters (136) are aligned with the patterned metal (126) when the iron characters are in the front-most position, wherein the rotatable iron (130) resides within the cap together with the patterned metal (126) when the cap (210) engages the first end (111) of the handle (110).

4. The portable branding iron system (100) of claim 1, wherein the iron characters are numbers, letters, or a combination herein.

5. The portable branding iron system (100) of claim 1, wherein a heat sensor (148) is disposed within the handle connector (115), wherein a low temperature indicator (141) and a high temperature indicator (142) are disposed on the handle (110) adjacent to the first end (111), wherein the heat sensor, low temperature indicator and high temperature indicator are operatively connected to the controller; wherein the heat sensor (148) is configured to sense a temperature of the handle connector (115) and send a temperature signal of the temperature of the handle connector (115) to the controller, wherein the controller compares the temperature signal to a first pre-determined temperature value and a second pre-determined value; wherein when the temperature signal is between the first pre-determined temperature value and the second pre-determined value, the controller (115) send a first output signal to the low temperature indicator (141) to turn on the low temperature indicator (141); wherein when the temperature signal is above the second pre-determined value, the controller (115) send a second output signal to the high temperature indicator (142) to turn on the high temperature indicator (142).

6. The portable branding iron system (100) of claim 1, wherein the cap (210) further comprises a cap battery (214), a cap heating coil (219), a cap switch (216), and a cap power indicator (218), wherein when the cap switch (216) is turned on, the cap heating coil (219) is heated by the cap battery (214) to expedite the heating process for the patterned metal (126) and a cap power indicator (218) is turned on.

7. The portable branding iron system (100) of claim 1, wherein the handle further comprises a hand grip (113), wherein the grip (113) is made of heat resistant silicon rubber.

8. The portable branding iron system (100) of claim 1, wherein the grip is wave-shaped.

\* \* \* \* \*